Sept. 5, 1967

M. H. GROVE 3,339,886

VALVE CONSTRUCTION

Filed Dec. 1, 1964

INVENTOR.
MARVIN H. GROVE
BY
*Fletcher and Swain*
ATTORNEYS

Sept. 5, 1967  M. H. GROVE  3,339,886
VALVE CONSTRUCTION
Filed Dec. 1, 1964  4 Sheets-Sheet 2
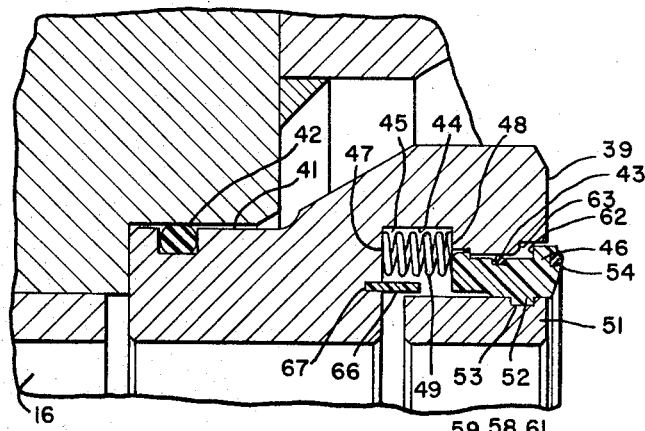
Fig 3A
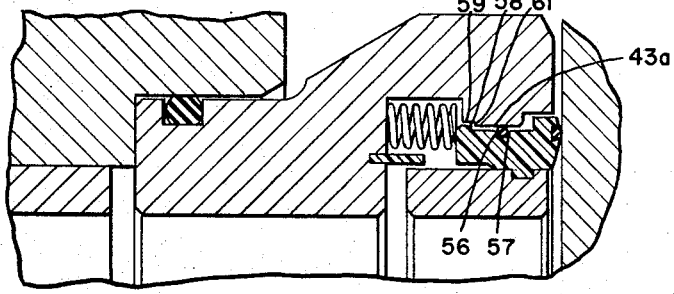
Fig 3B
Fig 10
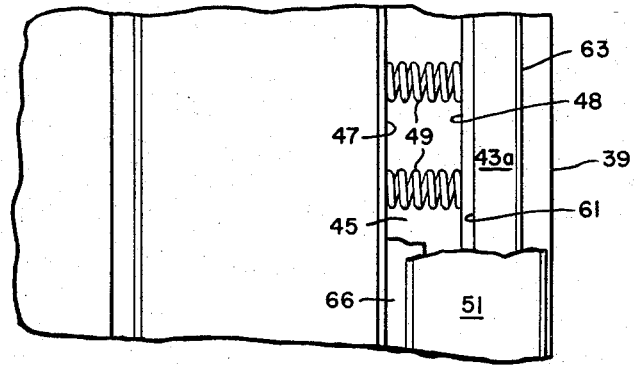
Fig 3C
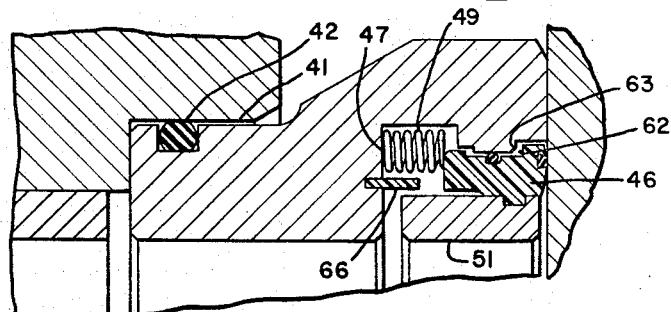
INVENTOR.
MARVIN H. GROVE
BY
ATTORNEYS Sept. 5, 1967     M. H. GROVE     3,339,886
VALVE CONSTRUCTION Filed Dec. 1, 1964     4 Sheets-Sheet 3

INVENTOR.
MARVIN H. GROVE
BY
ATTORNEYS

Sept. 5, 1967 M. H. GROVE 3,339,886
VALVE CONSTRUCTION
Filed Dec. 1, 1964 4 Sheets-Sheet 4

INVENTOR.
MARVIN H. GROVE
BY
ATTORNEYS

United States Patent Office 3,339,886
Patented Sept. 5, 1967

3,339,886
VALVE CONSTRUCTION
Marvin H. Grove, Piedmont, Calif., assignor to M. & J.
Valve Company, Houston, Tex., a corporation of
Delaware
Filed Dec. 1, 1964, Ser. No. 415,046
5 Claims. (Cl. 251—174)

ABSTRACT OF THE DISCLOSURE

A valve (e.g., gate, ball, etc.) having sealing assemblies that include coil compression springs. The springs are located within a circumferential recess in such a manner that they can be preassembled and retained in partially compressed condition before the seal ring part is applied. As initially preassembled the ends of the precompressed springs engage opposed bottom and shoulder surfaces whereby the springs are retained in proper position for further compression when the valve assembly is completed.

This invention relates generally to valves such as are employed for controlling fluid flow, and sealing means for use in such valves. Reference is made to my copending application Ser. No. 190,174, filed Apr. 25, 1962, now Patent No. 3,166,291, and entitled, "Valve Construction and Method" (particularly FIGURES 11 and 13).

In the construction of the more common types of flow control valves, such as valves of the gate and ball types, various sealing arrangements have been used for forming fluid tight seals between the movable valve part and the associated parts of the body. Generally, it is desirable to employ a sealing arrangement which will afford a substantial amount of accommodation. This facilitates the manufacture of valves in the larger sizes, and it simplifies alignment and machining requirements. In my Patent 3,121,553, granted Feb. 18, 1964, I have disclosed a valve having sealing means which affords a substantial degree of accommodation. The sealing means consists of a sleeve-like seal ring made of resilient material together with a relatively rigid carrier ring. This assembly is movably fitted within a recess formed in one of the valve parts, whereby one end face of the seal ring is adapted to form sealing contact with a valve working surface formed upon the other valve part. The seal ring is also sealed with respect to the one body part, and it is yieldably urged against the valve working surface on the other body part by spring means.

When a sealing arrangement such as disclosed in my Patent 3,121,553 is utilized in a valve of the gate or ball type, certain disadvantages may be encountered. This is particularly true when circumferentially spaced coil thrust springs are used in place of the garter type springs disclosed in said Patent 3,121,553 to permit greater accommodation and/or thrust. Particularly during assembly it is difficult to insert the coil springs in proper spaced relationship and to maintain such relationship while the seal ring is being applied. Also it is difficult to move the seal rings against the springs for insertion of the gate. In my Patent 3,166,291 granted Jan. 19, 1965, I have disclosed an arrangement which utilizes what I have referred to as a snap-in feature. Particularly the seal ring is so constructed whereby when pressed into its accommodating recess against the thrust of springs, a rib upon the ring snaps behind a shoulder formed in the body recess, thus maintaining the springs partially compressed before the gate is inserted. While this arrangement facilitates assembly, the force required for the snap-in feature makes field installation of the seal ring somewhat difficult.

Both of the above-described constructions tend to limit the number of coil springs that may be used and the thrust that such springs apply. Thus it is common to rely on fluid pressure differential to increase the thrust of the seal ring against the gate. In many instances this may result in excessive seal ring thrust with the result that the seal ring may be damaged and the gate may be frozen or moved only with difficulty.

In general, it is an object of the present invention to provide a valve construction having improved sealing means.

A further object of the invention is to provide a valve having sealing means which facilitates manufacture and assembly operations, including particularly the placement of coil thrust springs.

Another object is to provide a valve having improved sealing means which is relatively simple in construction and substantially less expensive to make than the constructions disclosed in my U.S. Patents 3,121,553 and 3,166,291.

Another object is to provide an improved valve and sealing means therefor which will facilitate the use of a wider variety of resilient materials.

Another object is to provide an improved valve and sealing means therefor which permits high spring thrust without use of differential pressure to maintain a seal under all working conditions.

Aditional objects and features of the invention will appear from the following description in which the preferred embodiments have been set forth in detail in conjunction with the accompanying drawing.

Referring to the drawing:

FIGURE 3A is an enlarged detail in section illustrating the sealing means incorporated in the valve shown in FIGURES 1 and 2;

FIGURE 3B is an enlarged section like FIGURE 3A, but showing the assembly in engagement with an adjacent gate;

FIGURE 3C is a detail like FIGURE 3B but showing the gate being forced by line pressure against the sealing assembly;

FIGURE 10 is a detail showing the positioning of springs for the embodiment of FIGURE 3A, the springs being viewed in a direction radial to the axis of the flow passages.

Figure 1:
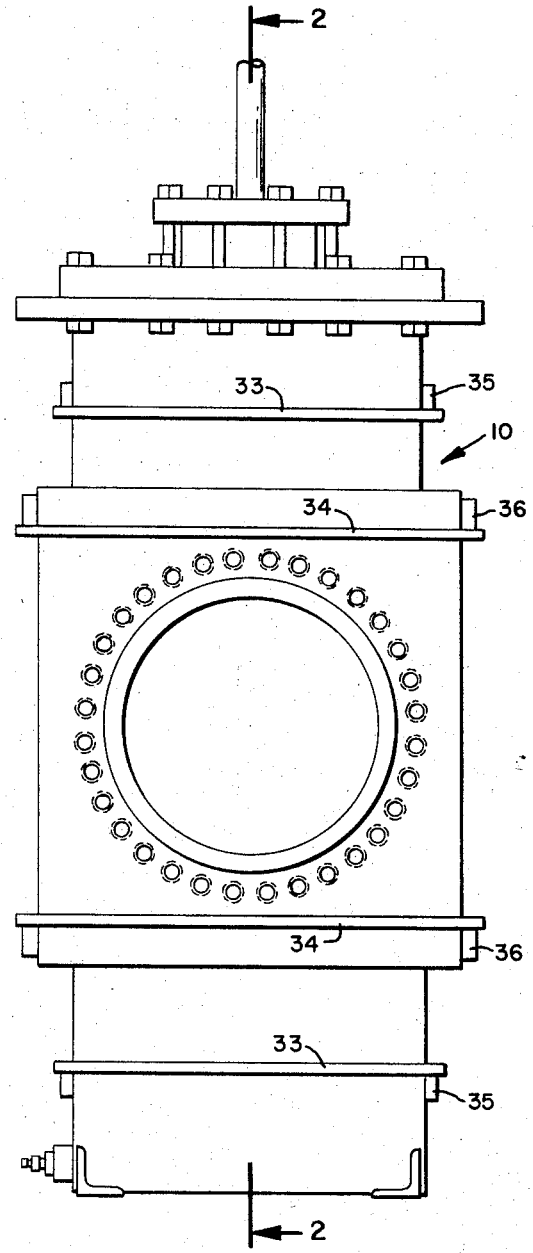
FIGURE 1 is an end view in elevation illustrating a valve in accordance with the present invention.

The valve illustrated in FIGURE 1 is of the gate type and consists of a body part 10 together with the inner valve member 11 in the form of a gate. The body 10 can be made of a metal tube which is rectangular in section, or a body of this form can be made by fabricating methods. Relatively heavy hub plates 12 are attached to the end walls 13 of the body, as by welding 14. The openings 16 in the hub plates form aligned flow passages. One end of the body is shown closed by bottom plate 17. The other end of the body is provided with the bolting flange 18 which mounts suitable bonnet means 19.

The valve gate 11 in this instance is flat, being provided with the side valve working surfaces 20. The operating stem 21 is connected with suitable external operating means, such as a hand or motor operated device.

The bonnet means 19 mounted upon the flange 18 includes the closure plate 26 together with the top plate 27, these parts being secured to the flange 18 by the bolts 28. The stem extends through this bonnet assembly and is sealed with respect to plate 26 by suitable means such as seal rings 31 and 32 of the resilient O-ring type. Likewise a suitable seal 33, such as one of the O-ring type, is provided between flange 18 and plate 26.

The body is shown reinforced by the ribs 33 and 34, which are welded at their ends to the connecting straps 35 and 36.

Figure 2:
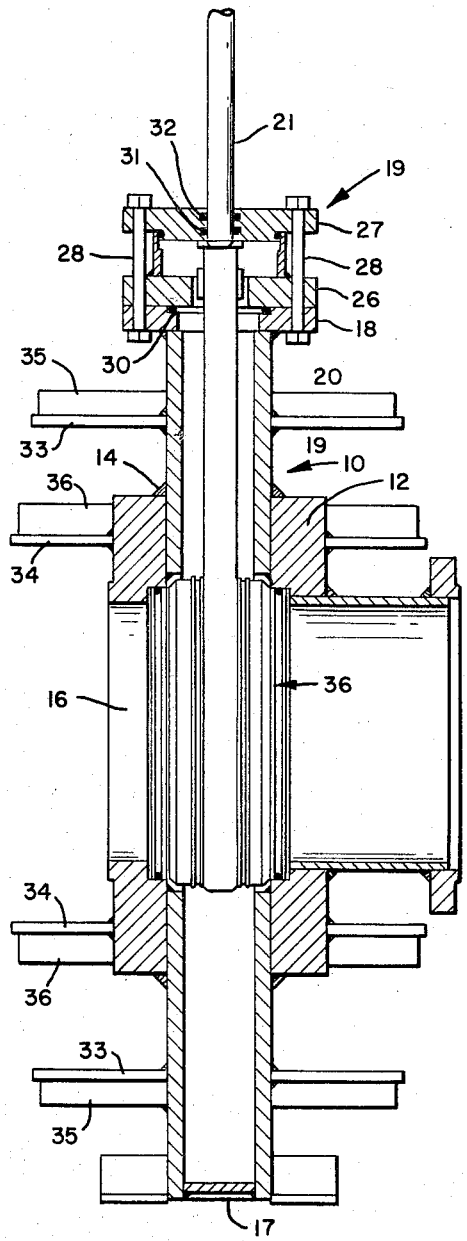
FIGURE 2 is a side elevational view in section taken along the line 2—2 of FIGURE 1.

Upon both sides of the gate 11 sealing assemblies 36 are provided which form seals between the gate and the body. One embodiment of the sealing means is shown in detail in FIGURES 3A, 3B and 3C. Each assembly consists of a mounting ring 39 which is fitted within the machined annular recess 41 formed in the body, and which is sealed with respect to the body by suitable means such as the seal ring 42 of the O-ring type. As will be seen from FIGURE 2, the recesses 41 can be formed in the relatively heavy hub plates 12. It will be evident that in some instances the mounting ring 39 can be an integral part of the body. In other words, it can be an annular portion integral with the hub plate 12 or other adjacent body part. As shown in FIGURE 3A, the mounting ring 39 is machined to provide the peripheral surface 43 together with the peripheral surface 44. The surface 43 is dimensioned to slidably accommodate the sleeve-like annular seal ring part 46. The peripheral surface 44 is in effect one of the defining surfaces of an annular recess 45, this recess also being defined by the bottom sealing surface 47 and the retention shoulder 48. The surfaces 47 and 48 are in opposition and are formed concentric with the axis of the flow passages 16.

Within the annular recess 45 I provide a plurality of circumferentially spaced coil springs 49. One end of each spring is seated upon the bottom surface 47, and a part of the other end is seated upon the shoulder 49. The radial dimensioning of shoulder 49 is substantially less, as for example about one-half the diameter of a coil spring 49, whereby a substantial part of the end of the spring which engages the shoulder 48 is available for engaging the seal ring 46. Before being inserted within the recess 45, each compression spring 49 has a relaxed length substantially greater than the distance between the bottom surface 47 and the shoulder 48. Thus when a spring is inserted, it must be compressed to enable it to be positioned between the surfaces 47 and 48, and thereafter it is released whereby its engagement with the surfaces retains it in the desired position.

The seal ring part 46 in this instance is sleeve-like in form and is made of a relatively hard non-metallic material having some elasticity, such as nylon. It is shown mounted upon a carrier ring 51 which can be formed of suitable metal and is relatively rigid. To ensure fixed retention of the nylon ring upon the carrier ring 51, the nylon ring is shown provided with a rib 52 which fits within a groove 53 on the carrier ring.

The nylon ring 46 can be suitably bonded to the carrier ring 51 as by means of suitable cement. Preferably, in place of or in addition to such bonding, the nylon ring has a shrunk fit upon the carrier ring. Thus at the time these parts are assembled, the nylon ring is heated to an elevated temperature, as by immersing it in boiling water, and the carrier ring 51 may be at ambient temperature or may be chilled to a relatively lower temperature. After the heated nylon ring has been placed about the carrier ring 51, the return of these parts to ambient temperature results in a relatively tight fit with prestressing of the parts.

That end of the nylon ring 46 which engages the gate 11 preferably is provided with an insert 54 formed of relatively softer resilient material, such as a suitable synthetic rubber or other elastomer. A seal ring having such an insert is disclosed and claimed in my copending application Ser. No. 253,416, filed Jan. 23, 1963.

The seal ring 46 is sealed with respect to the mounting ring 39 and the body by suitable means such as a seal 56 of the resilient O-ring type. This O-ring is shown disposed within a groove 57 in the periphery of the seal ring 46. It contacts the smooth cylindrical portion 43a of the peripheral surface 43.

The end of the seal ring 46 that is remote from the gate may be provided with an annular rib 58. This rib is on a diameter slightly greater than that of the cylindrical surface 43a, whereby when the ring 46 is installed within the mounting ring 39 substantial force must be applied to deform one end of the nylon seal ring a sufficient amount to permit it to pass through the cylindrical portion 43a. When forced into place the rib 58 snaps into the recess 59, and thereafter prevents displacement of the seal ring by engagement with the annular shoulder 61.

The seal ring 46 is also dimensioned and formed to provide the annular shoulder 62, which normally is in spaced relationship with the annular shoulder 63 on the mounting ring 39.

It will be noted that the dimensions of the carrier ring 51 are such that a portion of this carrier ring generally encloses the recess 45 that is occupied by the compression springs 49. In addition, the recess 45 may be enclosed by the annular sediment guard 66 which can be made of suitable material such as nylon, Teflon, or the like, and is retained within a recess 67 formed in the mounting ring 39. As will be seen in FIGURE 3A, the carrier ring 51 and the sediment guard 66 are in general overlapping relationship.

FIGURE 3A illustrates the various parts of the sealing assembly before the valve gate has been inserted. At this time the inner end of the seal ring 46 is in close proximity with the adjacent ends of the compression springs 49, and the compression springs remain in position by virtue of the fact that their ends press against the seating surface 47 and the retaining shoulder 48. When a valve gate is inserted between two such sealing assemblies, proportioning and arrangement of the parts is such that the seal rings 46 are moved inwardly with respect to the mounting rings 39 to substantially the position illustrated in FIGURE 3B. It will be noted from this view that the coil springs 49 now press against the adjacent end of the nylon ring 46 whereby all of the force of these springs urges the nylon seal ring 46 against the gate.

Although the gate may move a slight amount under the urge of differential fluid pressure, springs 49 always act upon the seal rings 46, whereby at all times spring thrust urges the seal rings upon both sides of the gate against the gate valve working surfaces. Assuming that a fluid pressure differential is applied to the gate with the gate in closed position, then on the downstream side the gate may be pressed against the adjacent end face of the mounting ring 39, in the manner illustrated in FIGURE 3C. Under such conditions, the seal ring 46 is forced farther within the mounting ring, and the compression springs 49 are compressed a greater amount. Likewise at this time the surfaces 62 and 63 may be in direct abutting contact.

In prior use of sealing assemblies of the type disclosed in my Patent 3,121,335, a fluid pressure area is provided whereby on the upstream side the seal ring is urged by fluid pressure differential against the gate. Assuming that the assemblies on opposite sides of the gate are duplicates, on the downstream side it may be necessary to rely upon the thrust of the gate against the sealing assembly to maintain a seal. Although the novel manner disclosed herein for retaining the compression springs 49 can be used for such fluid pressure operated assemblies, I prefer to provide a substantially balanced assembly such as illustrated in FIGURE 3A. In this balanced assembly the diameter of cylindrical surface 43a, which is engaged by the O-ring 56, is substantially the same as the effective diameter of the seal established between the insert 54 and the gate. Thus no fluid pressure area is provided, and the force with which the seal ring is urged against the gate is controlled substantially entirely by the thrust applied by the springs 49. These springs can have sufficient strength whereby they maintain the desired seal between the seal rings and the gate upon both the upstream and downstream sides of the gate, under all operating conditions.

As previously explained, assembly of the parts shown in FIGURE 3A, whether in the plant or under field conditions, involves positioning of the compression springs 49 in spaced circumferential relationship between the bottom surface 47 and the shoulder 48. Before these springs are inserted, they have a length somewhat greater than the distance between the surface 47 and the shoulder 48. Previous to assembling the carrier ring and the seal ring into the mounting ring 39, the coiled springs are placed in proper position with sufficient compression to enable such positioning whereby after an applied spring has been released, a portion of its one end presses against the shoulder 48 and is thereby retained in such position. Such retention of the springs is shown in FIGURE 10. After all of the compression springs have been properly positioned, the sediment guard 66 is applied, and then the carrier ring and seal ring are introduced into the mounting ring in the manner previously described. The various parts may be first assembled upon the mounting 39, and then this mounting ring applied to the valve body. Alternatively, the mounting ring may first be applied to the body, and thereafter the compression springs, sediment guard, carrier and seal rings applied.

As indicated above, during all operating conditions to which the valve is subjected, the seal ring parts 46 are acted upon by the compression springs 49. However, when the gate is removed, the compression springs apply their thrust against the shoulder 48, and therefore the carrier ring and the seal ring 46 can be removed from the mounting ring 39 without occasioning displacement or drop-out of the coil springs.

Figure 4:
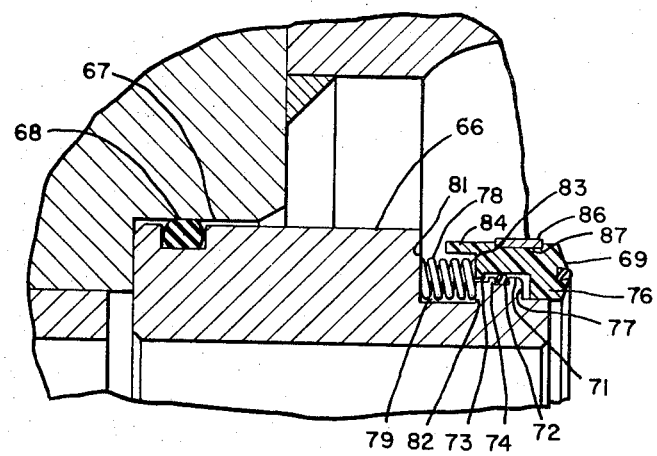
FIGURES 4 and 5 are enlarged details in section similar to FIGURE 3A but showing further embodiments.

The embodiment of FIGURE 4 is similar in many respects to that previously described, but differs in that the positioning of the parts is reversed. The mounting ring 66 corresponds to the mounting ring 39 of FIGURE 3A and is likewise removably fitted within the body recess 67 and sealed with respect to the body, as by means of the resilient O-ring 68. The seal ring 69 is again formed of suitable relatively hard resilient material, like nylon. The mounting ring 66 is machined to provide the peripheral surface 71, over which the ring 69 is slidably fitted. The ring 69 is sealed with respect to the mounting ring by the resilient O-ring 72. The seal ring is provided with a rib 73 on its inner periphery, which normally engages the annular shoulder 74 on the mounting ring, thus retaining the seal ring from displacement. As in the case of FIGURE 3A, the seal ring can be forced into the mounting ring by distortion which enables the rib 73 to snap behind the annular shoulder 74. The end portion of the seal ring which engages the gate is formed to provide the shoulder 76, which normally is in spaced opposed relationship to the shoulder 77 on the mounting ring 66. These shoulders may be in abutting contact on the downstream side of the gate when the gate is being forced toward the downstream side by pressure differential.

The compression springs 78 of FIGURE 4 are again accommodated within the recess 79, and the ends of these springs engage the bottom recess surface 81 and the shoulder 82. For all normal operating conditions of the valve, the springs press against the annular end surface 83 of the seal ring 69. The recess space generally occupied by the compression springs 78 is partially enclosed by the extension 84 on the seal ring 76. However, when the seal ring is not engaged by a gate, the parts occupy the positions shown in FIGURE 4 and the thrust of the springs 78 is carried upon the shoulder 82.

Instead of utilizing a carrier ring of the type shown in FIGURE 3A, in FIGURE 4 I employ a reinforcing metal band 86 which surrounds the outer periphery of the seal ring. This band may be seated within a recess 87 formed in the outer periphery of the seal ring and preferably it is seated upon the nylon seal ring by methods which ensure a relatively tight engagement with some precompression of the nylon. For example, at the time these parts are assembled, the nylon ring can be chilled to a relatively low temperature, and the metal band 83 can be heated to an elevated temperature whereby the band can be readily positioned over the nylon ring in the recess 87 before the parts return to ambient temperature. This provides a shrunk-on fit whereby normally the band 86 is under substantial tension and the nylon seal ring 69 is normally under compression. Such pre-compression has the advantage of fixing the dimensions of the nylon ring, thus preventing changes in dimensions during operation of the valve, due for example, to absorption of fluids, changes in temperature, etc.

Figure 5:
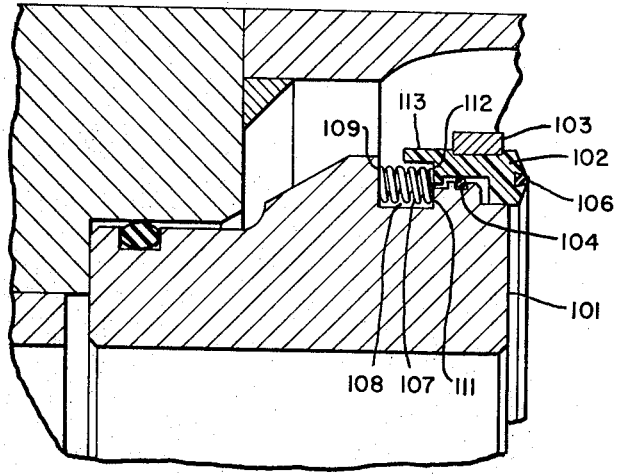

In general, the embodiment of FIGURE 3A is adapted to relatively high operating pressures, while the assembly of FIGURE 4 is adapted for somewhat lower operating pressures. The assembly of FIGURE 5 is also deemed suitable for the higher operating pressures. In this case the mounting ring 101 corresponds to the mounting ring 39 of FIGURE 3A, and is again removably seated within the valve body. It is machined to slidably accommodate the seal ring 102 which again is made of relatively hard resilient material like nylon. A reinforcing metal band 103 is disposed about the outer periphery of the seal ring 102, and can be shrunk in place in the same manner as described in connection with FIGURE 4. It will be noted that this metal band is somewhat thicker and more rigid than the band shown in FIGURE 4. The nylon ring 102 is sealed with respect to the mounting ring 101 by the resilient O-ring 104, and the seal ring is shown provided with a softer resilient insert 106 for engaging the valve working surface of the gate. The compression springs 107 are disposed within the machined recess 108, and before the gate is assembled the ends of these springs engage respectively the bottom surface 109 and the retention shoulder 111. After assembly of the gate, the thrust of the springs is transferred to the seal ring by virtue of engagement with the shoulder 112. The space occupied by the compression springs 107 is generally enclosed by the annular extension 113 on the seal ring 102.

As will be evident from an examination of FIGURES 4 and 5, in both instances the assembly is substantially balanced with respect to differential fluid pressure. In other words, in both instances the force with which the seal ring is urged against the adjacent gate is controlled substantially entirely by the thrust of the compression springs.

Figure 7:
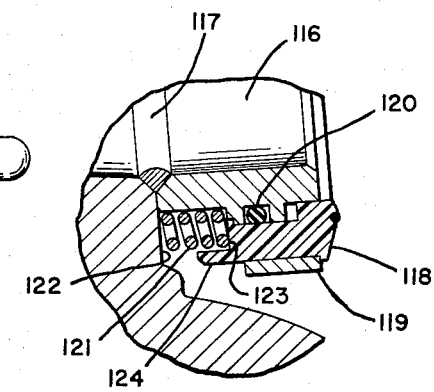
FIGURE 7 is a detail in section on an enlarged scale showing the sealing means incorporated in FIGURE 6.
Figure 8:
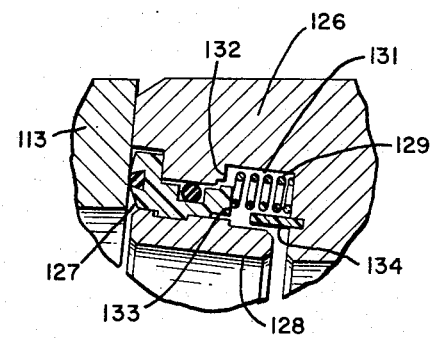
FIGURE 8 is a detail in section on an enlarged scale showing another embodiment of sealing means for the valve of FIGURE 6.
Figure 6:
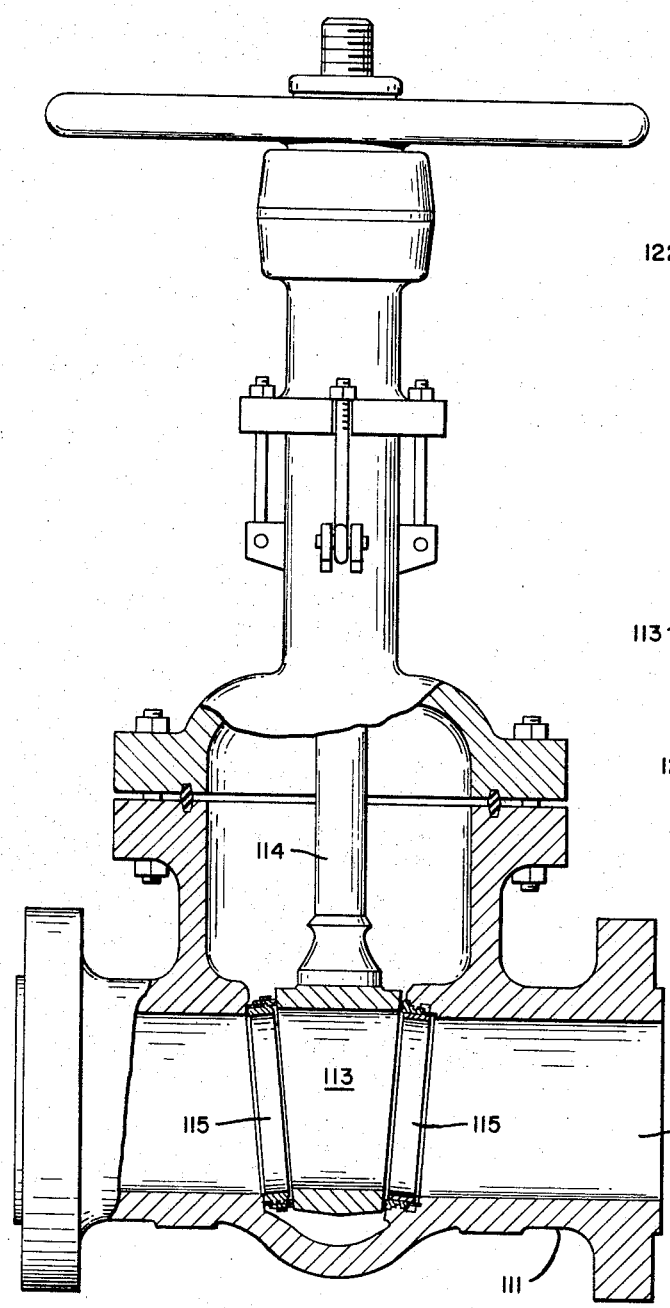
FIGURE 6 is a side elevational view in section illustrating a valve of the wedge gate type incorporating my invention.

FIGURES 6–8 show application of my invention to a valve of the wedge gate type. The valve in this instance consists of a body 111 provided with flow passages 112 and having the movable wedge shaped gate 113 carried by the valve operating stem 114. The sealing assemblies 115 are carried by the body on opposite sides of the gate when the gate is in closed position. The assembly as shown in FIGURE 7 consists of a metal mounting sleeve or ring 116 which can be attached to the body as by means of weld connection 117. The outer periphery of this mounting ring is machined to slidably receive the seal ring 118. This ring may likewise be made of relatively hard resilient material like nylon, and it may be reinforced by the metal band 119 applied in the manner previously described. A seal is provided between the mounting ring 116 and the seal ring 118, by the seal ring 120 of the O-ring type. A plurality of circumferentially spaced compression springs 121 are disposed about the mounting ring 116, and one end of each spring engages the bottom annular surface 122, and the other end of each spring normally engages one or the other of the annular shoulders 123, 125. These springs are applied in the same manner as described in connection with the other embodiments. When the valve gate is moved upwardly toward open position, out of contact with the seal rings 118, these rings move outwardly whereby the pressure of the compression springs 121 is transferred to the annular shoulders 125. However, when the valve gate is moved to full closed position, the seal rings 118 are engaged and forced against the pressure of the springs, thus transferring the thrust of the springs to the end surface 123 of the seal rings. Here again the space occupied by the compression springs is generally enclosed by the annular extension 124 which forms a part of the seal ring 118. In its general construction, the assembly of FIGURE 8 is somewhat similar to that shown in FIGURE 4.

In the embodiment of FIGURE 8, the valve body is constructed to provide the integral annular portion 126, and this portion is machined to slidably accommodate the seal ring 127. The seal ring in this instance, which again can be made of material like nylon, is shown mounted upon the rigid metal carrier ring 128, in a manner similar to that shown in FIGURE 3A. Here again the compression springs 129 are disposed within the annular recess 131. When the gate does not engage these seal rings, the relationship is such that the compression springs 129 are seated upon the annular shoulder 132. However, when the seal ring is engaged by the gate and forced to a position such as shown in FIGURE 8, the thrust of springs 129 is taken by the end 133 of the seal ring. A sediment guard 134 is used with the assembly of FIGURE 8 and is somewhat similar to the guard 66 of FIGURE 3A.

Figures 9, 11:
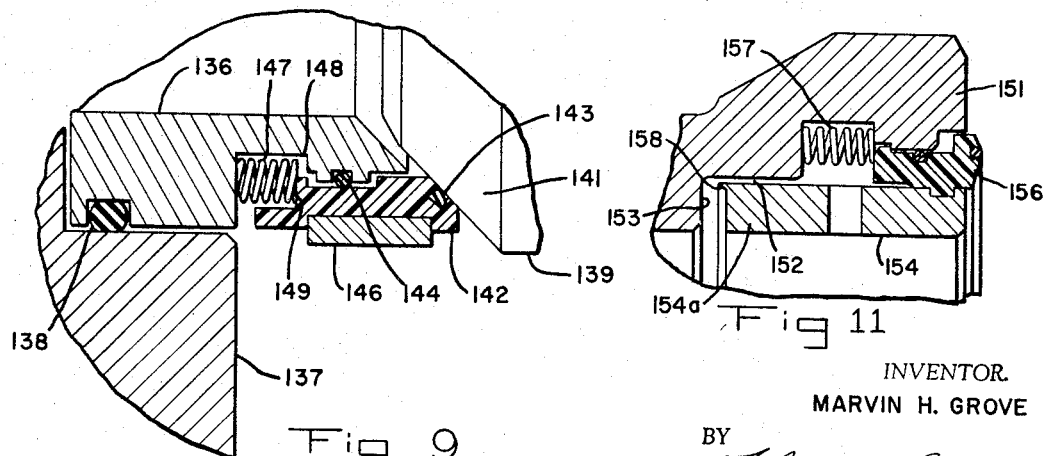
FIGURE 9 is a detail in section showing application of my invention to a valve of the ball type.
FIGURE 11 is a detail in section illustrating another embodiment in which the nylon seal ring surrounds the metal carrier ring.

FIGURE 9 illustrates an embodiment applicable to valves of the ball type. In this instance a mounting ring 136 is fitted within the valve body 137, and is sealed with respect to the valve body as by means of the O-ring 138. Here again, if desired mounting ring 136 may be an integral part of the valve body. The valve ball 139 is provided with a substantially spherical shaped valve working surface 141 which is engaged by the sealing assembly.

The sealing assembly of FIGURE 9 consists of a seal ring 142 again made of relatively hard resilient material like nylon, which is shown provided with a softer resilient insert 143 for making fluid-tight contact with the valve working surface 141. The seal ring is sealed with respect to the mounting ring 136, as by means of the O-ring 144. The seal ring is shown provided with a reinforcing metal band 146 which is applied in the same manner as described in connection with FIGURE 4. When the seal ring is not in engagement with the valve working surface, the compression springs 147 all engage the annular shoulder 148. However, during normal operation the thrust of the compression springs is taken by the end surface 149 of the seal ring. As illustrated the effective diameter of the seal with respect to surface 140 is somewhat greater than the effective diameter in which O-ring 144 seals. However by changing the dimensions and the configuration of the nylon ring in section, the seal may be balanced.

It will be evident from the foregoing that my invention is capable of many embodiments, and that these embodiments may adapt the invention to a wide variety of valves. In each instance the assemblies can be constructed whereby they are under the control of the compression springs without relying upon fluid pressure differential to force them against the valve working surface of the gate. By virtue of the manner in which the springs are retained, both factory and field assembly are greatly facilitated, and in addition it is possible to utilize a sufficient number of springs to provide the desired thrust for high pressure operating conditions.

The embodiment shown in FIGURE 11 is somewhat similar to that of FIGURES 3A to 3C, except that the sediment guard 66 is omitted and the carrier ring 51 is made larger. Thus the mounting ring is similar to ring 39, but is machined to provide the cylindrical surface 152 and the shoulder 153. The carrier ring 154 to which the nylon seal ring 156 is secured has an end portion 154a which overlaps and is loosely concentric with surface 152. The compression springs 157 are retained and act in the same manner as in FIGURES 3A through 3C. The carrier ring 154 is shown with a vent to effect pressure equalization. Also the carrier ring is provided with a sharpened lip 158 to prevent freezing by accumulation of sediment. A feature of the assembly shown in FIGURE 11 is that the carrier ring is relatively rigid and provides adequate strength to prevent seal ring displacement under high pressure operating conditions.

I claim:

1. In a valve construction, a body part having aligned flow passages, a valve member disposed within the body part and movable between open and closed positions relative to the passages, annular sealing means disposed concentric with the axis of said passages and forming a fluid-tight seal between at least one side of the valve member and the body part in a region surrounding the corresponding flow passage, said sealing means including a sleeve-like seal ring part, means forming a peripheral surface on said body part, the seal ring part being slidably fitted with respect to said peripheral surface for some freedom of axial movement, a plurality of circumferentially spaced coil springs, one of said parts providing an annular space adjacent to said seal ring part within which said coil springs are disposed, said space being a recess defined by an annular peripheral surface concentric with the seal ring and by spaced opposed bottom seating and shoulder retaining surfaces, all of said surfaces being on one of said parts and integral therewith, each of said springs when relaxed having a length greater than the spacing between said bottom and shoulder surfaces and having one end thereof seated on said bottom seating surface and the other end thereof adapted to engage and press against said shoulder surface, the radial dimensioning of said shoulder surface being substantially less than the external diameter of said springs and so dimensioned that the engagement of the springs therewith serves to retain the springs in the recess when the springs are assembled before application of the seal ring part, the other one of said parts having a portion thereof adapted to seat upon the end portions of said springs adjacent said shoulder thereby to receive the thrust of said springs to urge said seal ring part against the valve member when the valve member is within the body part and engaged with the seal ring part.

2. A valve as in claim 1 in which the valve member is in the form of a flat gate having flat valve working surfaces on its opposite sides.

3. A valve as in claim 1 in which the valve member is in the form of a tapered gate having valve working surfaces upon its opposite sides.

4. A valve construction as in claim 1 in which the valve member is in the form of a rotating ball having a spherical valve working surface adapted to have sealing contact with said seal ring part.

5. A valve construction as in claim 1 in which the sealing contact between the seal ring part and the adjacent valve member is on a diameter that is substantially the same as the diameter of the seal between said seal ring and the one valve part, whereby said seal ring is substantially balanced with respect to differential pressure applied to the same.

(References on following page)

References Cited

UNITED STATES PATENTS

| | | | |
|---|---|---|---|
| 2,623,724 | 12/1952 | Downey | 251—174 X |
| 2,815,187 | 12/1957 | Hamer | 251—328 |
| 3,118,650 | 1/1964 | Cooper | 251—172 |
| 3,121,553 | 2/1964 | Grove | 251—172 |
| 3,166,291 | 1/1965 | Grove | 251—172 |
| 3,252,684 | 5/1966 | Ksieski | 251—174 X |

FOREIGN PATENTS

| | | |
|---|---|---|
| 623,905 | 5/1949 | Great Britain. |

WILLIAM F. O'DEA, *Primary Examiner*

H. W. WEAKLEY, *Assistant Examiner.*